(12) United States Patent
Emigh et al.

(10) Patent No.: US 12,463,861 B2
(45) Date of Patent: *Nov. 4, 2025

(54) DISTRIBUTED SYSTEM OF HOME DEVICE CONTROLLERS

(71) Applicant: Brilliant NextGen Inc., San Mateo, CA (US)

(72) Inventors: Aaron T. Emigh, Incline Village, NV (US); Steven Stanek, Fremont, CA (US); Ashley Chou, San Mateo, CA (US); Jeremy Hiatt, San Mateo, CA (US)

(73) Assignee: Brilliant NextGen Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,115

(22) Filed: Apr. 4, 2022

(65) Prior Publication Data

US 2022/0224596 A1 Jul. 14, 2022

Related U.S. Application Data

(63) Continuation of application No. 17/191,525, filed on Mar. 3, 2021, now Pat. No. 11,329,867, which is a
(Continued)

(51) Int. Cl.
*H04L 41/0668* (2022.01)
*H04L 12/28* (2006.01)
(Continued)

(52) U.S. Cl.
CPC ...... *H04L 41/0668* (2013.01); *H04L 12/2803* (2013.01); *H04L 12/2807* (2013.01);
(Continued)

(58) Field of Classification Search
CPC ............ H04L 41/0668; H04L 12/2803; H04L 12/2807; H04L 12/282; H04L 12/2827; H04L 67/10; H04L 67/125
See application file for complete search history.

(56) References Cited

U.S. PATENT DOCUMENTS 9,208,676 B2 12/2015 Fadell et al.
9,614,690 B2 4/2017 Ehsani et al.
(Continued)

FOREIGN PATENT DOCUMENTS

CN 106814720 A 6/2017
CN 107229230 A 10/2017
(Continued)

OTHER PUBLICATIONS

International Search Report and The Written Opinion of The International Searching Authority mailed Apr. 18, 2019, for related PCT Application No. PCT/US19/012698 filed Jan. 8, 2019, 7 pages.
(Continued)

*Primary Examiner* — Alina A Boutah
*Assistant Examiner* — Adam A Cooney
(74) *Attorney, Agent, or Firm* — Mahamedi IP Law LLP

(57) ABSTRACT

A home device controller can monitor published state data on a message bus of a distributed system of home device controllers, the published state data indicating current states of home devices connected to each home device controller of the distributed system. The home device controller can detect, from the message bus, a fault condition corresponding to a specified home device controller in the distributed system of home device controllers. Based on the fault condition and a set of acquisition rules, the home device controller acquires a home device in the local network of the specified home device controller in the distributed system. Based on the published state data on the message bus, the
(Continued)

home device controller maintains a current state of the acquired home device.

17 Claims, 9 Drawing Sheets

Related U.S. Application Data continuation of application No. 16/517,551, filed on Jul. 20, 2019, now Pat. No. 10,985,972.

(60) Provisional application No. 62/701,422, filed on Jul. 20, 2018.

(51) Int. Cl.
*H04L 67/10* (2022.01)
*H04L 67/125* (2022.01)

(52) U.S. Cl.
CPC ........ *H04L 12/2809* (2013.01); *H04L 12/281* (2013.01); *H04L 12/2812* (2013.01); *H04L 12/2814* (2013.01); *H04L 12/282* (2013.01); *H04L 12/2827* (2013.01); *H04L 67/10* (2013.01); *H04L 67/125* (2013.01)

(56) References Cited

U.S. PATENT DOCUMENTS

| | | | |
|---|---|---|---|
| 9,835,434 B1* | 12/2017 | Sloo | G06F 3/002 |
| 10,375,897 B2 | 8/2019 | Reilly | |
| 10,623,246 B1* | 4/2020 | Iyer | H04L 12/2832 |
| 11,507,217 B2 | 11/2022 | Emigh | |
| 2002/0016639 A1 | 2/2002 | Smith | |
| 2003/0040812 A1 | 2/2003 | Gonzales | |
| 2006/0132303 A1 | 6/2006 | Stilp | |
| 2006/0212136 A1 | 9/2006 | Lee | |
| 2008/0158172 A1 | 7/2008 | Hotelling | |
| 2008/0223706 A1 | 9/2008 | Hagiwara | |
| 2009/0158188 A1 | 6/2009 | Bray | |
| 2010/0001746 A1 | 1/2010 | Duchene | |
| 2010/0146423 A1 | 6/2010 | Duchene | |
| 2011/0063224 A1 | 3/2011 | Vexo | |
| 2011/0137836 A1 | 6/2011 | Kuriyama | |
| 2012/0259992 A1* | 10/2012 | Koehler | H04W 12/06 709/229 |
| 2012/0310415 A1 | 12/2012 | Raestik | |
| 2013/0131839 A1* | 5/2013 | Washington | G05B 15/02 700/19 |
| 2013/0157729 A1 | 6/2013 | Tabe | |
| 2013/0187887 A1 | 7/2013 | Mizuhashi | |
| 2013/0191233 A1 | 7/2013 | Atkinson | |
| 2013/0198858 A1 | 8/2013 | Atkinson | |
| 2013/0201151 A1 | 8/2013 | Takashima | |
| 2013/0219520 A1 | 8/2013 | Atkinson | |
| 2014/0006465 A1 | 1/2014 | Davis | |
| 2014/0071588 A1 | 3/2014 | Chen | |
| 2014/0094123 A1* | 4/2014 | Polo | H04W 52/0216 455/41.2 |
| 2014/0108019 A1 | 4/2014 | Ehsani | |
| 2014/0201666 A1 | 7/2014 | Bedikian | |
| 2014/0225855 A1 | 8/2014 | Aitchison | |
| 2014/0253483 A1 | 9/2014 | Kupersztoch | |
| 2014/0257532 A1 | 9/2014 | Kim | |
| 2014/0266669 A1 | 9/2014 | Fadell | |
| 2014/0292396 A1 | 10/2014 | Bruwer | |
| 2015/0005952 A1* | 1/2015 | Sasaki | H04L 12/282 700/275 |
| 2015/0077343 A1* | 3/2015 | Shao | G06F 1/1662 73/862.381 |
| 2015/0097780 A1 | 4/2015 | Hotelling | |
| 2015/0156031 A1 | 6/2015 | Fadell | |
| 2015/0163412 A1 | 6/2015 | Holley | |
| 2015/0187209 A1 | 7/2015 | Brandt | |
| 2015/0241860 A1 | 8/2015 | Raid | |
| 2015/0256391 A1 | 9/2015 | Hardy | |
| 2015/0293513 A1 | 10/2015 | Schlette | |
| 2016/0012348 A1 | 1/2016 | Johnson et al. | |
| 2016/0025367 A1 | 1/2016 | Matsuoka et al. | |
| 2016/0043926 A1* | 2/2016 | Frei | H04L 12/2803 709/224 |
| 2016/0117019 A1 | 4/2016 | Takeda | |
| 2016/0259308 A1 | 9/2016 | Fadell | |
| 2016/0277203 A1 | 9/2016 | Jin | |
| 2016/0277204 A1 | 9/2016 | Kang | |
| 2016/0291947 A1* | 10/2016 | Gao | H04L 12/6418 |
| 2016/0372138 A1* | 12/2016 | Shinkai | G10L 25/66 |
| 2017/0005818 A1 | 1/2017 | Gould | |
| 2017/0006504 A1* | 1/2017 | Townend | H04W 28/0257 |
| 2017/0017324 A1 | 1/2017 | O'Keeffe | |
| 2017/0019265 A1 | 1/2017 | Hou | |
| 2017/0026194 A1 | 1/2017 | Vijayrao et al. | |
| 2017/0131891 A1 | 5/2017 | Novet | |
| 2017/0163437 A1* | 6/2017 | Yang | G05B 11/01 |
| 2017/0178466 A1* | 6/2017 | Chiu | G08B 23/00 |
| 2017/0187809 A1* | 6/2017 | Chen | H04L 12/6418 |
| 2017/0195130 A1 | 7/2017 | Landow et al. | |
| 2017/0205958 A1 | 7/2017 | Kurasawa | |
| 2017/0220197 A1 | 8/2017 | Matsumoto | |
| 2017/0280274 A1 | 9/2017 | Notohardjono | |
| 2017/0292712 A1 | 10/2017 | Alexander | |
| 2017/0336902 A1 | 11/2017 | Smith | |
| 2017/0339004 A1* | 11/2017 | Hall | H04L 43/0805 |
| 2017/0357439 A1* | 12/2017 | Lemay | G06F 3/0484 |
| 2017/0359190 A1* | 12/2017 | Nadathur | H04L 12/2816 |
| 2018/0052451 A1* | 2/2018 | Billi-Duran | G05B 19/41835 |
| 2018/0091326 A1 | 3/2018 | McLaughlin | |
| 2018/0091331 A1* | 3/2018 | Agrawal | H04L 69/40 |
| 2018/0160284 A1 | 6/2018 | Lim | |
| 2018/0160301 A1 | 6/2018 | Kwon | |
| 2018/0181248 A1 | 6/2018 | Chang | |
| 2018/0181849 A1 | 6/2018 | Cassidy | |
| 2018/0191517 A1 | 7/2018 | Emigh | |
| 2018/0292962 A1 | 10/2018 | Choi | |
| 2018/0300645 A1 | 10/2018 | Segal | |
| 2018/0323996 A1 | 11/2018 | Roman | |
| 2019/0029096 A1 | 1/2019 | O'Driscoll et al. | |
| 2019/0035567 A1 | 1/2019 | O'Keeffe | |
| 2019/0215184 A1 | 7/2019 | Emigh et al. | |
| 2019/0229943 A1 | 7/2019 | Edwards | |
| 2019/0265858 A1 | 8/2019 | Nishio | |
| 2019/0280891 A1 | 9/2019 | Pognant | |
| 2019/0371145 A1 | 12/2019 | McQueen et al. | |
| 2020/0007356 A1* | 1/2020 | Mason | H05B 47/155 |
| 2020/0028734 A1 | 1/2020 | Emigh et al. | |
| 2020/0097112 A1 | 3/2020 | Seo | |
| 2020/0162287 A1* | 5/2020 | Wang | H04L 61/5014 |
| 2020/0210222 A1 | 7/2020 | Kim | |
| 2021/0019284 A1* | 1/2021 | Bowman | G06F 9/5072 |
| 2021/0194758 A1 | 6/2021 | Emigh | |
| 2021/0208723 A1 | 7/2021 | Emigh | |
| 2021/0208724 A1 | 7/2021 | Emigh | |
| 2021/0210939 A1 | 7/2021 | Emigh | |
| 2021/0211319 A1 | 7/2021 | See | |
| 2021/0218399 A1 | 7/2021 | Cardanha | |
| 2022/0006664 A1 | 1/2022 | Emigh | |
| 2023/0019612 A1 | 1/2023 | See | |
| 2023/0044270 A1 | 2/2023 | Emigh | |

FOREIGN PATENT DOCUMENTS

| | | |
|---|---|---|
| EP | 1624398 A1 | 2/2006 |
| EP | 3073338 A1 | 9/2016 |
| EP | 3131235 A1 | 2/2017 |
| EP | 2887166 B1 | 7/2019 |
| WO | 2009050093 A1 | 4/2009 |
| WO | WO-2017/107521 | 6/2017 |
| WO | WO-2017/192752 | 11/2017 |
| WO | WO-2018/129105 | 7/2018 |
| WO | WO-2019/136440 | 7/2019 |
| WO | WO-2020/018995 | 1/2020 |

(56) References Cited

FOREIGN PATENT DOCUMENTS

OTHER PUBLICATIONS

International Search Report and The Written Opinion of The International Searching Authority mailed Nov. 14, 2019, for related PCT Application No. PCT/US19/42843 filed Jul. 22, 2019, 8 pages.
International Search Report and The Written Opinion of The International Searching Authority mailed Feb. 25, 2021, for related PCT Application No. PCT/US21/12214 filed Jan. 5, 2021, 8 pages.
Extended European Search Report dated Mar. 9, 2022, Application No. 19837970.3 11 pages.
Extended European Search Report dated Dec. 21, 2023, Application No. 21736185.6-1211 8 pages.

* cited by examiner

DISTRIBUTED SYSTEM OF HOME DEVICE CONTROLLERS

CROSS REFERENCE TO RELATED APPLICATION

This application is a continuation of U.S. patent application Ser. No. 17/191,525, filed on Mar. 3, 2021; which is a continuation of U.S. patent application Ser. No. 16/517,551 (now U.S. Pat. No. 10,985,972), filed on Jul. 20, 2019; which claims the benefit of priority to U.S. Provisional Application No. 62/701,422, filed on Jul. 20, 2018, the aforementioned applications being hereby incorporated by reference in their respective entireties.

BACKGROUND

Home control systems, such as lighting control systems used for lighting fixtures, include binary analog switches and analog dimmer switches that enable users to control one or more lights wired to an electrical box upon which such switches are connected. Faults can occur with smart home systems that leave certain smart home functionality ineffective until the fault is resolved.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
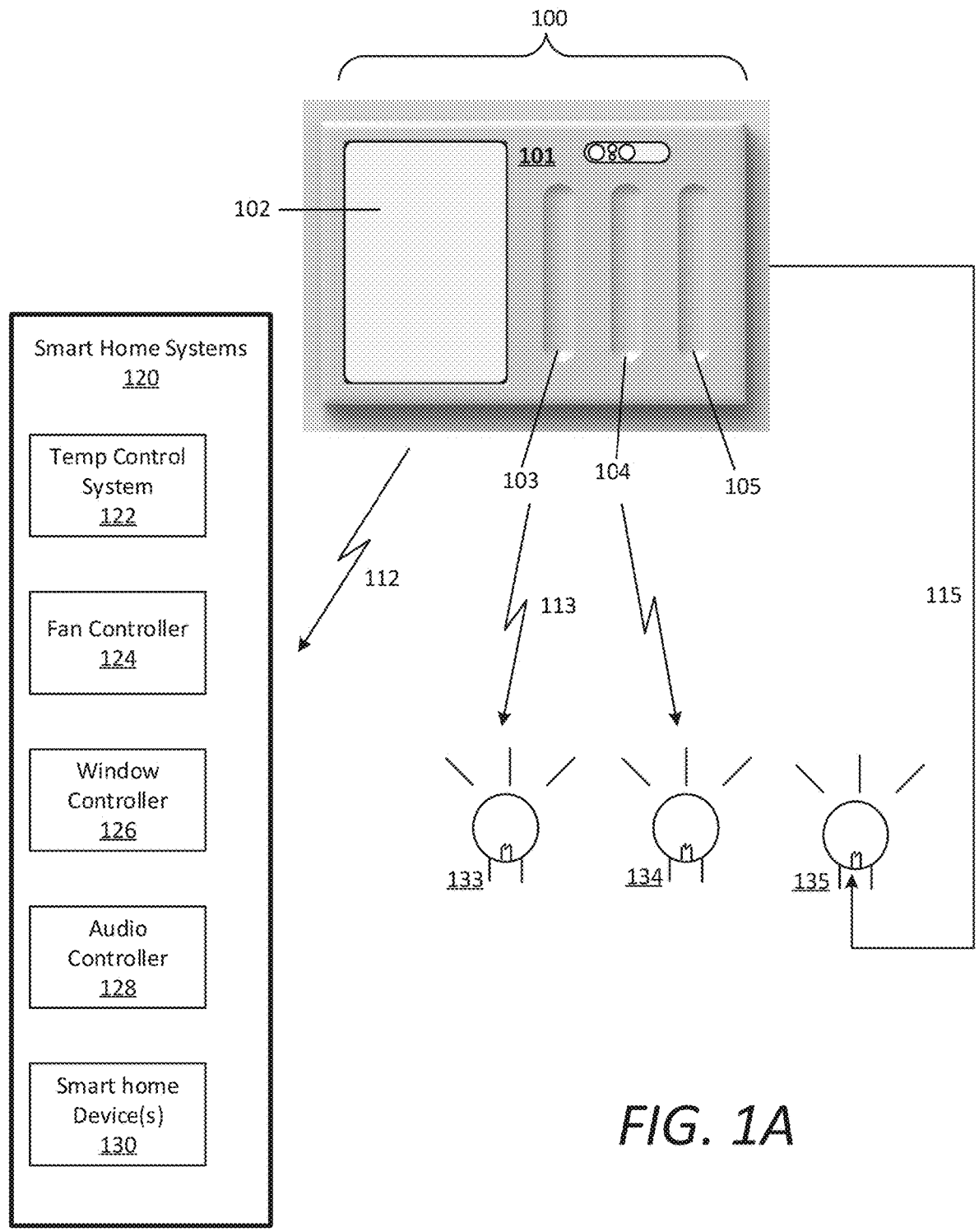
FIG. 1A illustrates an example of a home device controller including a touch control panel comprising multiple touch control grooves, according to various embodiments.

A distributed communication system of home device controllers is described herein. The distributed system can comprise a plurality of home device controllers, each being connected to a local network of home devices. For example, a home device controller can be wirelessly connected to one or more smart home devices or systems (e.g., a smart light, temperature control system, audio or entertainment system, etc.). In certain implementations, the home device controller can be wired to a home device (e.g., a light) using existing home wiring (e.g., light switch wiring) of a household. A user can interact with the home device controller via voice and/or touch gesture input to remotely operate the local network of home devices connected to the home device controller.

In various embodiments, the home device controller can include at least one touch control groove formed on a control panel of the home device controller. The touch control groove can comprise an elongated (e.g., vertically elongated) indentation within the control panel, and can be coupled to or otherwise influence a set of touch sensors (e.g., a capacitive slider sensor) provided underneath or behind the touch control groove. The user can perform one or more gestures on the touch control groove, which can be detect by a touch controller or microcontroller that generates a set of signals based on the gesture. The signals can be transmitted to processing resources (e.g., a microprocessor) of the home device controller, which can interpret the performed gesture (s) as control commands for a respective home device. For example, the touch control groove can be configured to control an adjustable parameter of a home device, such as a dim level of a light, volume of an audio system, temperature of a climate control system, and the like.

In certain implementations, the home device controller can include a touch screen, upon which the user can select from a set of home devices in the local network of the home device controller. In selecting a home device on the touch screen, the home device controller can remap the touch control groove to operate the selected home device. Accordingly, subsequent touch gestures performed on the touch control groove may be interpreted by the microprocessor of the home device controller as control commands specific to the selected home device. In certain aspects, the home device controller can be configured such that touch gestures performed on the touch screen can also be interpreted to control the selected home device. In certain aspects, the preselected home device can be controlled via touch gestures on the touch screen regardless of the current content being displayed on the touch screen (e.g., a preconfigured set of digital photographs).

A given home, business, or other space, can comprise any number of home device controllers each being operable to directly control a set of home devices within that home device controller's local network of home devices. Additionally, any home device within the space (e.g., a temperature control system) can be operated via any home device controller. For example, the user can control an audio system within the local network of a first home device controller through interaction with a second home device controller by selecting the audio system from a selectable menu of operable home devices on the touch screen of the second home device controller, and performing a set of touch gestures (e.g., tap gestures to select a radio channel or slide, swipe, tap-hold, and/or scroll gestures to make audio selections and/or change the volume). Upon receiving each set of gesture inputs, the second home device controller can interpret the gestures as a request to change the state of the audio system. The second home control device will generate a set of named values that represent the change and transmit them to the first home device controller, which can generate corresponding control commands for execution by the audio system.

According to embodiments described herein, each home device controller can publish any observed state changes to home devices within its local network of home devices to a message bus of the distributed system of home device controllers. State changes may be made through direct interaction with the home device (e.g., a user turning a dial on an audio device to change the volume), or via the home device controller. In either case, the state change may be detected and published to the message bus. In certain implementations, the message bus can comprise a distributed data store comprising a list of home device identifiers, state identifiers and values for each home device (e.g., indicating dim level of a light, audio level of a sound system, temperature of a climate control system, etc.), and a time stamp indicating the time of the last stage change. In some aspects, each home device controller can also publish a periodic update of the respective states of its local network of home devices to the message bus.

As provided herein, a current "state" of a home device can comprise one or more named values corresponding to any adjustable parameter of the home device or a sub-device of that home device. In one example, a light bulb can have a current state corresponding to its current dim level (e.g., between zero and a maximum n, with zero being an off state, n being a maximum brightness state, and any value therebetween being a respective dim level of the light). As another example, the current state of an audio system can include a volume level, a current radio channel, a current file selection (e.g., a song), and the like. In this example, the home device controller having the audio system within its local network can publish a set of named values, corresponding to the current state of the audio system to the message bus (e.g., either periodically or triggered by every state change of the audio system).

In various implementations, the distributed data store comprising the current state values for each home device of the distributed system of home controller devices can be included in the memory of a communication hub (e.g., a third-party hub), distributed redundantly in local memory of the home device controllers, or in a backend memory device (e.g., accessible over a network). In some aspects, each state change of a specified home device published to the message bus can overwrite previous state for that specified home device in order to maintain an up-to-date state for the message bus. Additionally or alternatively, the named values or published state from a particular home device controller can become stale after a predetermine period of time.

At any given time, a fault condition can arise in the distributed system of home device controllers. For example, a tripped circuit breaker can cause a home device controller to deactivate, resulting in the home devices within its local network to lose connectivity with or operability through the distributed system of home device controllers. According to examples provided herein, the distributed system of home device controllers can leverage the message bus to perform a leasing arbitration, based on a set of lease acquisition rules, so that one or more other home device controllers can acquire and directly connect with the home devices previously within the local network of the downed home device controller.

In various examples, each home device controller can monitor the message bus for state changes or fault conditions. A fault condition can be detected by a home device controller if a downed home device controller fails to update state information of its home devices (e.g., misses one or more periodic updates mandated by the distributed system). In some implementations, the downed home device controller can transmit a failure message to the message bus, which can trigger the lease acquisition phase for its local network of home devices. In accordance with various implementations described, once the downed home device controller is back online (e.g., a power failure is resolved), the home device controller can publish a state update to the message bus to acquire home devices automatically (e.g., as the leaseholder of those home devices).

The set of lease acquisition rules can determine which of the remaining home device controllers acquire which home device(s) of the downed home device controller. The lease acquisition rules can set forth requirements and preferences corresponding to each home device to be acquired. In this manner the lease acquisition rules may fluctuate based on the home devices being acquired. For example, a home device requiring a Bluetooth LE connection can comprise a hard rule that only home device controllers within Bluetooth LE range of that home device can be candidates for acquiring the lease to that home device. As another example, a home device controller must have the load capability (e.g., available bandwidth) of acquiring the lease to a home device. Thus, if a home device controller is already connected to several home devices, acquisition of the lease has the potential to cause load thresholds to be crossed (e.g., causing transmission latency to one or more home devices within the local network). In this example, the home device controller would be deprioritized as a candidate for acquiring the home devices of the downed controller.

In certain aspects, the lease acquisition arbitration process performed by the home device controllers can be resolved near-instantaneously such that the home devices of the downed home device controllers can be acquired by any home device controller (except for the downed controller). Once a lease to a home device is acquired, the acquiring home device controller becomes the lease holder of that home device for a predetermined period of time (e.g., each lease comprises an expiration time), or until an alternative triggering condition causes the acquiring home device controller to free the lease (e.g. if bandwidth becomes too constrained). While the acquiring home device controller is the lease holder, any state changes to the acquired device can be published by the acquiring controller to the message bus. In certain examples, when the lease to the home device expires, the current leaseholder can have first priority to renew the lease, and/or the lease arbitration process can recommence to ensure that the home controller device with the greatest "fitness" or current capability to acquire the lease becomes the new leaseholder. As provided herein, the "fitness" criteria of a home device controller in acquiring a lease to a home device can comprise multiple factors, including proximity to the home device, bandwidth requirements, current load on the home device controller, required communication protocol(s), and the like. In this manner, the distributed system of home device controllers can dynamically minimize lease contention and optimally spread load throughout the system, whether the entire system is functioning nominally or whether one or more fault conditions exist.

Acquisition of a lease of a home device can trigger the acquiring home device controller to establish a network connection to the acquired home device (e.g., using Bluetooth, WiFi, Zigbee, Z-wave, etc.). In certain examples, the acquisition of a lease can cause the acquiring home device controller to secure a connection to the acquired device via multiple communication protocols (e.g., via a communications hub). Thereafter, any gestures or inputs a user performs to control the acquired home device can be processed into requested state changes that are relayed to and/or processed by the acquiring home device controller such that control commands corresponding to the user's gestures and/or inputs can be generated and transmitted to the acquired home device by the home device controller. Thus, all of the controllable home devices can continue to be operable via the distributed system of home device controllers even when one or more home device controllers experience a fault.

Described herein are examples of "home device" controllers. However, such "home devices" are not limited to controllable or smart home devices within a household, but may be any remotely operable smart device in any setting (e.g., outdoors, in a business environment, etc.). Thus, the term "home" is termed in relation to any system environment where the distributed system of home device controllers is installed, and can include households, office spaces, other indoor spaces of businesses or other entities, outdoor spaces, and the like. For example, a smart device described herein as a home device can comprise a remotely operable sprinkler system, computing device, television or entertainment system, kitchen devices (e.g., a stove, oven, refrigerator, coffeemaker, tea kettle, toaster, etc.), security system, garage door, gate, mailbox, doors, window shade actuators, fans, etc. A home device can also comprise a device wired to the home device controller (e.g., via standard light wiring) and traditionally operable by an analog light switch or dimmer switch. Such wired devices can include lights, fans, etc.

Among other benefits, the examples described herein achieve a technical effect of dynamically resolving fault conditions for distributed home control systems through the use of a distributed data store comprising a message bus to which each home device controller can publish state data and timestamps corresponding to the current states of the home devices within their direct local control. When a home device controller experiences a fault condition, the distributed system can perform lease acquisition processes for each home device of the downed controller, and maintain system control of those home devices.

As used herein, a home device controller can comprise a computing device and can provide network connectivity and processing resources for communicating with a local network of home devices and a distributed system of home device controllers over one or more networks. The home device controller can also comprise custom hardware, and in certain examples, can also operate a designated application configured to communicate with the network of home device controllers.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Memory, processing, and network resources may all be used in connection with the establishment, use, or performance of any example described herein, including with the performance of any method or with the implementation of any system.

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on computing devices, such as the home device controllers described herein. Other examples of computer storage mediums include portable storage units, such as flash drives or flash memory (such as those included in smartphones, multifunctional devices or tablet computers). Computers, terminals, network-enabled devices (e.g., mobile devices or home device controllers described herein) are all examples of machines and devices that utilize processors, memory, and instructions that may be stored on computer-readable mediums. Additionally, examples may be implemented in the form of computer-programs, or a computer usable carrier medium capable of carrying such a program.

Home Device Controller

FIG. 1A illustrates an example of a home device controller including a touch control panel comprising multiple touch control grooves, according to various embodiments. The example shown in FIG. 1A is a frontal view of the home device controller 100 that includes touch control panel 101. According to one or more examples, the home device controller 100 may provide the capability for a user to control lighting levels of one or more connected lights 133, 134, 135. The touch control panel 101 can comprise a mounting plate for a wall, and may be a component of the home device controller 100, which can include AC electronics and may be mounted in a wall (e.g., of a building such as a home or business). In some embodiments, the touch control panel 101 may include a removable bezel, e.g. a plastic bezel, that may be snapped on and off of the unit, thereby providing a capability for cosmetic changes, e.g. color changes, without necessitating replacement of the entire touch control panel 101.

In the example shown in FIG. 1A, the home device controller 100 can be mounted to replace an existing light switch panel, and can further utilize the existing load and line wires of the gang-box mounted within the wall behind the light switch panel. The home device controller 100 can include processing and memory resources as well as network communication modules implementing one or more network communications protocols. In certain aspects, one or more of the touch control grooves (e.g., control groove 105) can be associated with a wired connection 115 to a home device, such as a light element 135 (e.g., via a direct wiring from a load wire attached to the home device controller). For such wired connections, the home device need not be a smart home device (e.g., including a controller and/or wireless communication module).

In various examples, the home device controller 100 can include lighting control capability that may be integrated into the same module. For example, a home device controller 100 can function as an AC dimmer, which commonly dims a light by chopping up or otherwise manipulating the output AC waveform on the load wire going to a light by eliminating some portion of the output, relative to the input line AC (e.g., of the line wire), during a phase of the duty cycle (e.g., a leading edge or trailing edge dimmer which may chop out a part of the waveform either before or after zero crossings), resulting in a duty cycle that indicates the desired amount of dimming. In various embodiments, the home device controller 100 can perform such dimming using a triac or a field-effect transistor (FET), such as a MOSFET (e.g., a pair of FETs and/or MOSFETs), which may be under the control of a microcontroller or touch controller (e.g., an Atmel ATTiny or ATMega) that receives instructions on a desired on/off/dimming level state and adjusts its outputs accordingly.

In some embodiments, the home device controller 100 may utilize DC power for lighting (e.g., 10V, 12V, or 24V) in which the output voltage may be varied. In some embodiments, the home device controller can utilize a Digital Addressable Lighting Interface (DALI) for controlling a light. In some embodiments, the home device controller can transmit lighting control commands, corresponding to a specified on/off/dimming state, based on touch gestures on the control groove 103, 104, 105 using a wireless network such as WiFi, Zigbee, Z-Wave, or Bluetooth (including BLE).

The control panel 101 can include one or more touch control grooves 103, 104, 105, each of which can be formed on the touch control panel 101 of the home device controller 100 and may provide the capability to adjust lighting or control functions other home devices. A touch sensor, such as a capacitive touch sensor or a combination of a plurality of capacitive touch sensors, may be placed underneath or otherwise coupled to each control groove 103, 104, 105. For example, the touch sensor may be embedded in a printed circuit board (e.g., made of glass-reinforced epoxy laminate sheets, such as FR4) or in polyimide film such as Kapton, which in some embodiments may be integrated with a flex connector.

In various implementations, the control panel 101 can further include a touch screen 102. In an illustrative embodiment, software may provide a user interface on the screen 102, or via a mobile application on a smartphone or a website provided by a server, which provides the user with an option to map a particular touch control groove to a particular output, such as a physical lighting circuit connected to the home device controller 100, a physical lighting circuit connected to a different home device controller, or a third party device such as a smart bulb, an audio system, smart blinds or curtains, a thermostat, or a fan. When a home device is selected to be mapped to a touch control groove 104, the home device controller 100 may be notified and may store a mapping in its memory (e.g., in non-volatile memory such as flash memory) that associates the home device with an identifier associated with the touch control groove 104. Subsequently, when a gesture is detected in the touch control groove 104, the mapping may be consulted, or a state resulting from an earlier consultation of the mapping may be in place, and consequently the home device may be controlled accordingly by the gesture in the touch control groove 104.

Connected to otherwise coupled to each touch control groove 103, 104, 105 may be a corresponding touch sensor or set of touch sensors (e.g., a capacitive touch slider). The touch sensor may be configured to perform in a slider configuration, and/or may be implemented utilizing any combination of capacitive touch sensors, such as CapTIvate™ capacitive touch sensor technology developed by Texas Instruments. In certain embodiments, the touch slider can comprise such as a planar or non-planar, self-capacitance or mutual capacitance, interdigitated X and Y electrodes, or flooded-X capacitive slider, and may be implemented behind the control grooves 103, 104, 105. The touch sensor can be connected to a touch controller, such as a microcontroller. The touch controller can analyze the capacitance of the touch sensor and generate digital or analog signals. Signals from the touch controller may be transmitted to a microprocessor, for example, using a Universal Asynchronous Receiver/Transmitter (UART), Inter-Integrated Circuit (I²C), or Serial Peripheral Interface bus (SPI).

Each touch slider may be associated with a particular light circuit (e.g., the home device controller 100 may have multiple outputs, each of which can be assigned to a particular touch slider and therefore a particular corresponding touch control groove). Therefore, when the touch controller detects a gesture at a particular touch slider corresponding to a particular touch control groove, the touch controller can transmit a set of signals corresponding to the touch gesture to a microprocessor of the home device controller 100, which can generate a corresponding control command for the circuit corresponding to the touch slider and control groove combination. In some embodiments, such circuits may be physical circuits (e.g., AC or DC circuits as described above). In some embodiments, such circuits may be virtual circuits, wired or unwired, and the microprocessor can transmit the control instructions corresponding to the detected gesture, as described above using the applicable network (e.g., WiFi, Zigbee, Z-Wave, DALI, Bluetooth, etc.).

Touch gestures may be performed by a user in any of the touch control grooves 103, 104, 105 and interpreted by the microprocessor of the home device controller 100 to generate the control commands for any of the lights 133, 134, 135 or smart home systems 120 connected to the home device controller 100. In particular, the microprocessor can detect one-dimensional touch gestures such as taps, flicks, and slides. For example, the microprocessor can detect touch gestures by analyzing the signals corresponding to gestures performed on the touch control grooves 103, 104, 105. The signals can be received by the microprocessor over a specific interface (e.g., UART, I²C, SPI, etc.) used for communication between the touch controller(s) and the microprocessor. At the microprocessor, the signals may be interpreted to determine positions and times at which a finger is detected (or ceases to be detected), and from which the microprocessor can calculate touch velocities, accelerations, touch pressure, and touch position on the respective control groove 103, 104, 105. The microprocessor can combine the touch positions, times, velocities, etc. to derive gestures can generate corresponding control commands for connected lighting devices 133, 134, 135 or other home device systems 120. In some embodiments, machine learning techniques may be applied to create gesture recognizer models using training data of touch gestures and corresponding classifications (e.g., from a plurality of people).

In various examples, the microcontroller or touch controller can assign numerical values to the dimming level of lights in a predetermined range 0 . . . n, where 0 represents "off" and n represents a maximum value. On/off lights such as lights that are not dimmable or are otherwise configured not to be dimmed may have n=1 in some embodiments, or may use the same maximum value as an unrestricted dimmable light in some embodiments. The microcontroller can transmit the assigned numerical value to a module (e.g., a microprocessor of the home device controller 100 or a processing resource of a smart bulb) that sets the output level of the light.

In some embodiments, lights may be calibrated to have a minimum and/or maximum dim value. The maximum dim value can correspond to a maximum brightness to which the light may be interactively dimmed. The minimum dim value can correspond to a minimum brightness "on" value to which the light can be dimmed (e.g., any increase in the dim level from a 0 "off" value may incur immediately setting the dim level to the minimum dim level, which may be adjusted upward therefrom, and any decrease in the dim level from the minimum level may incur immediately setting the dim level to a 0 "off" value).

According to various examples, the screen 102 can comprise a touch screen and can enable the user to operate any number of connected smart home systems 120, such as smart light devices 133, 134, a temperature control system 122, a fan controller 124, a window controller 126, an audio controller 128, or any other smart home device 130 (e.g., a smart kitchen appliance, sprinkler system, security system, an electrical outlet, a door lock, a garage door, a doorbell, a video camera, a cooking appliance, etc.). In certain implementations, the user can select a particular smart home device on the touch screen 102 and can utilize a touch control groove 103, 104 to turn on/off or adjust a particular adjustable parameter of the selected smart home device.

In variations, the screen 102 itself can behave as a touch control groove, and the user can input gestures thereon to control a selected smart home device in accordance with the description provided herein (e.g., using the Y-axis reported by the touch screen as the position within a touch control groove for touch gesture recognition as described herein). In such embodiments, gesture recognition may be performed in the presence of other user interface elements being displayed on the screen, such as picture display, motion art display, selectable items such as scenes or devices, etc. In such embodiments, when a touch on the screen is detected, the microprocessor may determine whether the touch comprises a touch control gesture, as discussed herein. If so, then the microprocess can cause the functionality for that gesture to be executed by the selected home device. If not, then the touch information may be relayed to other processing components for interpretation, such as interactions with an on-screen user interface.

In one example, if the user selects the temperature control system 122 on a displayed selectable menu on the touch screen 102, the microprocessor can be triggered to interpret gestures performed on the touch screen 102 as control commands for adjusting the room temperature. Thus, a touch-scroll gesture upwards on the touch screen 102 can cause the microprocessor to generate commands to increase the temperature of the room, and transmit those temperature control commands to the temperature control system 122.

In certain implementations, a touch control groove (e.g., control groove 103) can act as a dedicated control groove for a particular smart home device (e.g., light element 133). In such implementations, the user can perform gestures on the control groove 103, and the microprocessor of the home device controller 100 therein can interpret the gesture, generate control commands for the light element 133 in accordance with the gesture, and transmit the control commands to the light element 133 over a wireless connection 113 using a specified communication protocol (e.g., Zigbee).

In variations, a touch control groove (e.g., control groove 104) can comprise a universal control groove 104 that can dynamically change connectivity between the various smart home systems 120 and/or light elements 133, 134 based on user selections from a displayed selectable menu on the screen. Furthermore, based on a user selection of a particular smart home device, the microprocessor therein can adaptively alter or remap gesture interpretations for gestures performed on the control groove 104. For example, if the user selects the window controller 126 on the touch screen, the microprocessor can be triggered to interpret gestures performed on the control groove 104 as control commands for an actuator or servo operable to open or close window shades or blinds, and transmit the control commands to the window controller 126 over a wireless connection 112.

In further implementations, the touch screen 102 can graphically display dynamic content corresponding to the gestures being performed by the user on the touch screen 102 or a particular control groove 103, 104, 105, such as displaying a dynamic temperature setting, dim value, fan speed, window-shade setting, or volume. The utilization of three touch control grooves 103, 104, 105 shown in FIG. 2 is purely illustrative, and it is contemplated that the same techniques described herein may be implemented for one, two, four, five, six or more touch control grooves (and corresponding touch sliders).

Figure 1B:
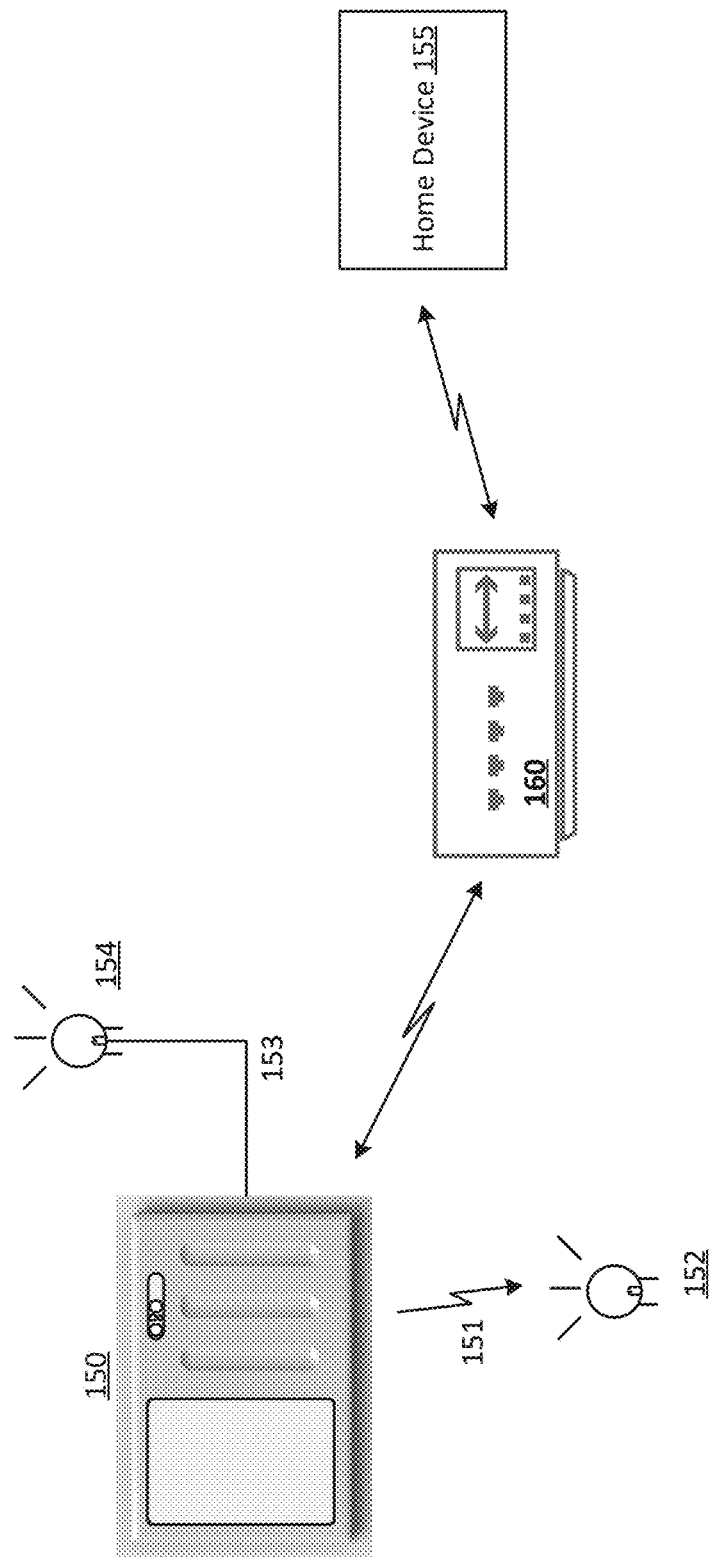
FIG. 1B illustrates an example of a home device controller utilizing a communication hub, according to various embodiments.

FIG. 1B illustrates an example of a home device controller utilizing a communication hub, according to various embodiments. The home device controller 150 shown in FIG. 1B can correspond to the home device controller 100 shown and described with respect to FIG. 1A, and can comprise a local network of controllable home devices. In the example shown, the home device controller 150 can be used to control a light element 154 via a load or line wire 153 of existing wiring of a previous light switch. Additionally or alternatively, the home device controller 150 can be used to control a smart light element 152 using a direct wireless connection 151 with the smart light 152.

In certain implementations, the home device controller 150 can leverage the resources of a communication hub 160 to relay control commands to a home device 155 within the local network of the home device controller 150. For example, the home device 155 may require a communication protocol that is unavailable on the home device controller 150, but available via the communication hub 160. In variations, the communication hub 160 can act as a relay to transmit state changes on the home device 155 (e.g., a user changing the volume of audio) to the home device controller 150, which the home device controller 150 can publish as a set of named values to a message bus of a distributed data store corresponding to each home device controller of a distributed system (e.g., within a home or business.

Distributed Home Device System

Figure 2A:
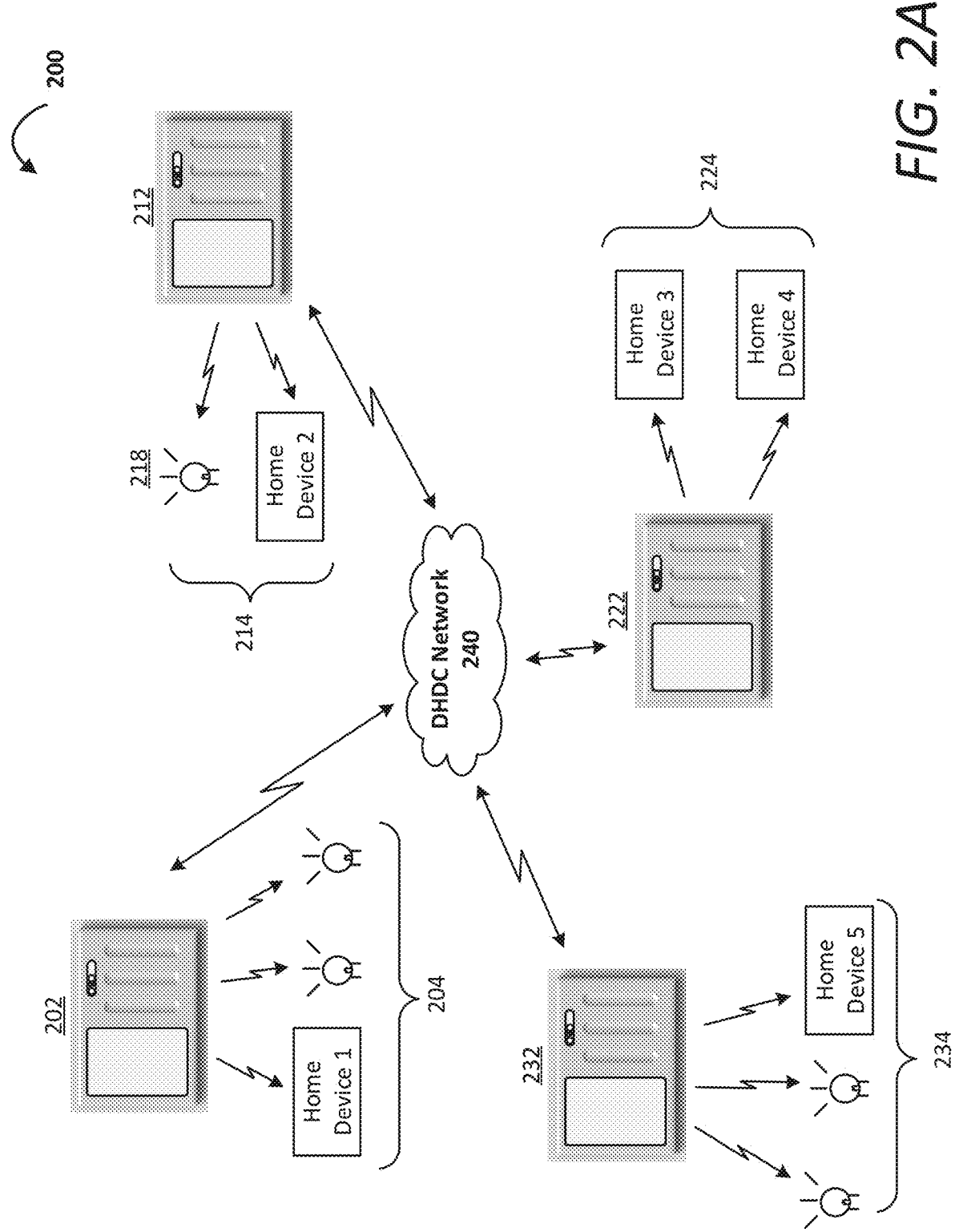
FIGS. 2A-2D illustrate examples of a distributed system of home device controllers executing distributed communications and fault control, according to various embodiments.

FIGS. 2A-2D illustrate examples of a distributed system of home device controllers 200 executing distributed communications and fault control, according to various embodiments. Each home device controller 202, 212, 222, 232, shown in FIGS. 2A through 2D can comprise an example of a home device controller 100, 150 as shown and described with respect to FIGS. 1A and 1B. Referring to FIG. 2A, the distributed system 200 can include any number of home device controllers 202, 212, 222, 232 each having a local network of any number of home devices 204, 214, 224, 234. A user may interact with any individual home device controller (e.g., home device controller 202) to operate any home device within the local network 204 of that home device controller 202, and any home device in the local networks 214, 224, 234 of the remaining home device controller 212, 222, 232 in the distributed system 200 via a distributed home device controller network 240 (DHDC Network 240) that connects each of the home device controllers 202, 212, 222, 232 with each other.

In the example shown in FIG. 2A, home device controller 202 can comprise the leaseholder of a local network of home devices 204 comprising two light elements and home device 1. It is to be noted that the light elements shown in FIG. 2A through 2D can also be described as home devices, but are not labeled as such for simplicity. Home device controller 212 is the leaseholder of a local network 214 comprising one light element 218 and home device 2. Home device controller 224 is the leaseholder of a local network 224 comprising home device 3 and home device 4. And, home device 232 is the leaseholder of a local network 234 comprising two light elements can home device 5.

As a distributed system 200, when a new home device is installed or otherwise enters the influence of the distributed system 200, the home device controllers 202 can enter into a lease acquisition arbitration process that determines which home device controller 202, 212, 222, 232 ultimately acquires the lease, as leaseholder, to include the new home device within its local network. It is contemplated that the lease acquisition rules for the arbitration process are minimally contentious or non-contentious based on objective current capabilities of each home device controller 202, 212, 222, 232 to control the new device. As such, the control requirements and location of the device may be revealed to the DHDC network 240 (e.g., during a discovery phase), and such factors as proximity, bandwidth requirements, current load on each individual home device controller, required communication protocol(s), and the like may be determinative regarding which home device controller ultimately become the leaseholder of the new home device. In variations, a new home device may be configured by a user to be established within the local control network of a specified home device controller in the system 200.

In various implementations, any state changes to any adjustable parameter of the home devices under control of the distributed system 200 (e.g., dim level changes, volume changes, temperature adjustments, etc.) can be processed and published to a message bus of the DHDC network 240. The message bus can enable each home device controller 202, 212, 222, 232 to publish the state changes as named values (e.g., dim level values) appended to a device identifier of the home device, and a time stamp corresponding to a time in which the state change took place. In certain examples, the home device controllers 202, 212, 222, 232 may be required to periodically publish the current state of each home device within its respective local network 204, 214, 224, 234 to the message bus, which can transmit the state change data to a distributed data store via the DHDC network 240. As provided herein, the distributed data store can be included in local memory of the home controller devices 202, 212, 222, 232 of the distributed system 200, one or more communication hubs leveraged by one or more of the home device controllers (e.g., such as described with respect to FIG. 1B), and/or a local or remote computing device or server accessible via the DHDC Network 240.

According to various examples of FIG. 2A, as the leaseholder to light element 218 and home device 2, home device controller 212 can receive relayed control commands from any other home device controller 202, 222, 232 in the distributed system 200 via the DHDC Network 240 to operate light element 218 and home device 2. Likewise, a user can operate home device controller 212 to transmit control commands to any home device (and light element) in any local network 204, 224, 234 of the other home device controllers 202, 222, 232 via the DHDC Network 240.

Figure 2B:
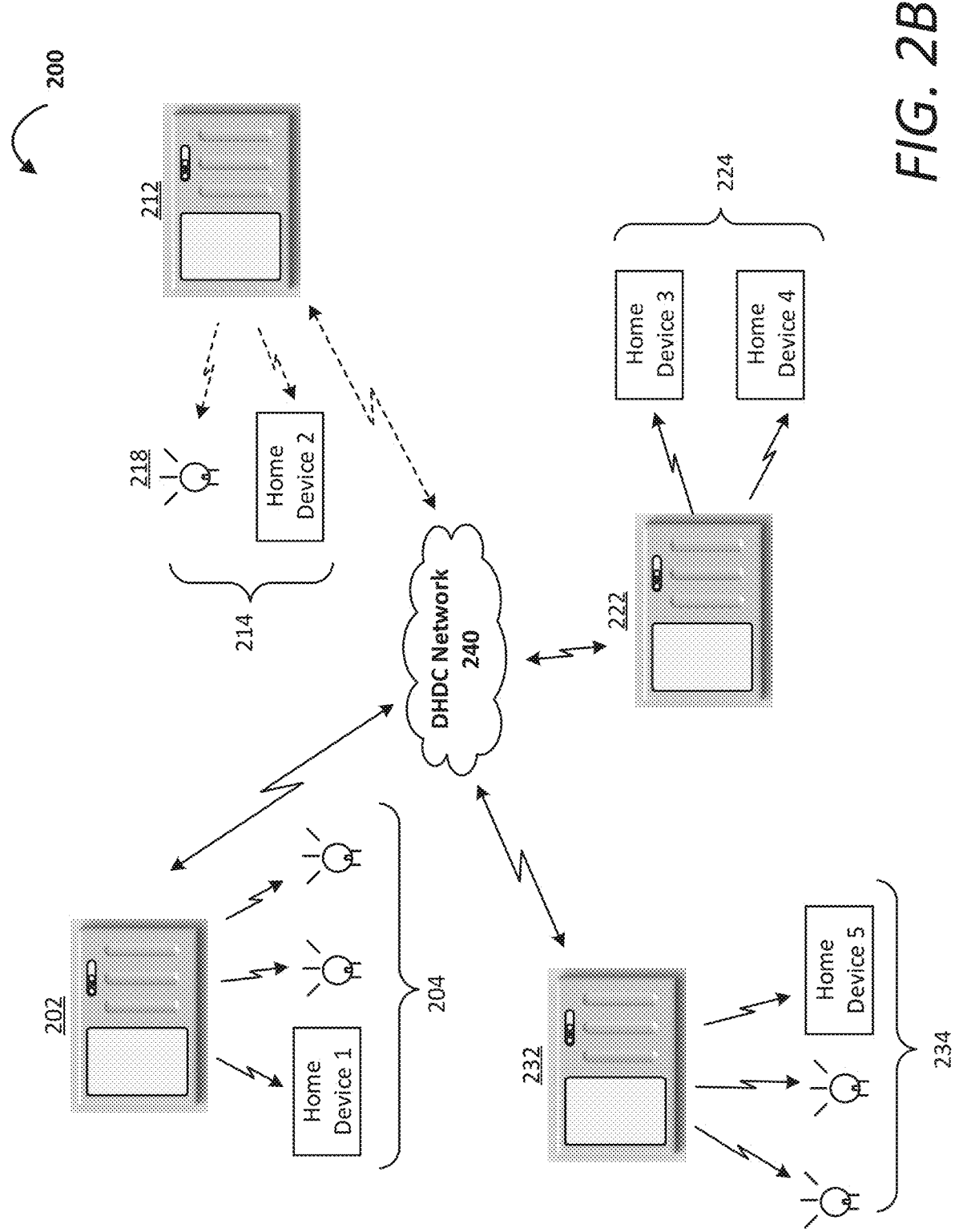

Referring to FIG. 2B, a fault condition can occur with any of the home device controllers (e.g., home device controller 212). The fault condition can comprise a component failure of the home device controller 212, a tripped circuit breaker or other power outage, wireless signal latency, or any other condition causing problems or a disruption between home device controller 212 and its local network of home devices 214 and/or the DHDC Network 240. Accordingly, the light element 218 and home device 2 can comprise connection leases that are up for grabs by the other home device controllers 202, 222, 232, and a lease arbitration process for each of light element 218 and home device 2 can be initiated by the distributed system 200.

The fault condition on home device controller 212 may be detected in a number of ways. In one example, a time expiration for periodic publication requirements to the message bus may lapse, indicating that home device controller 212 has gone down or otherwise been deactivated. In variations, the home device controller 212 can include a local power supply (e.g., one or more batteries) that enable the home device controller 212 to transmit a fault message to the message bus prior to powering down. The fault condition may be detected by any of the remaining home device controllers 202, 222, 232 in the distributed system 200. For example, a home device controller (e.g., home device controller 222) may subscribe to the publications of home device controller 212, and therefore monitor the message bus for updates from home device controller 212. If home device controller 212 fails to provide an update to the message bus (e.g., a publication time period expires), then home device controller 222, as subscriber to home device controller 212, can generate an alert to the DHDC network indicating that home device controller 212 has been deactivated or powered down.

Figure 2C:
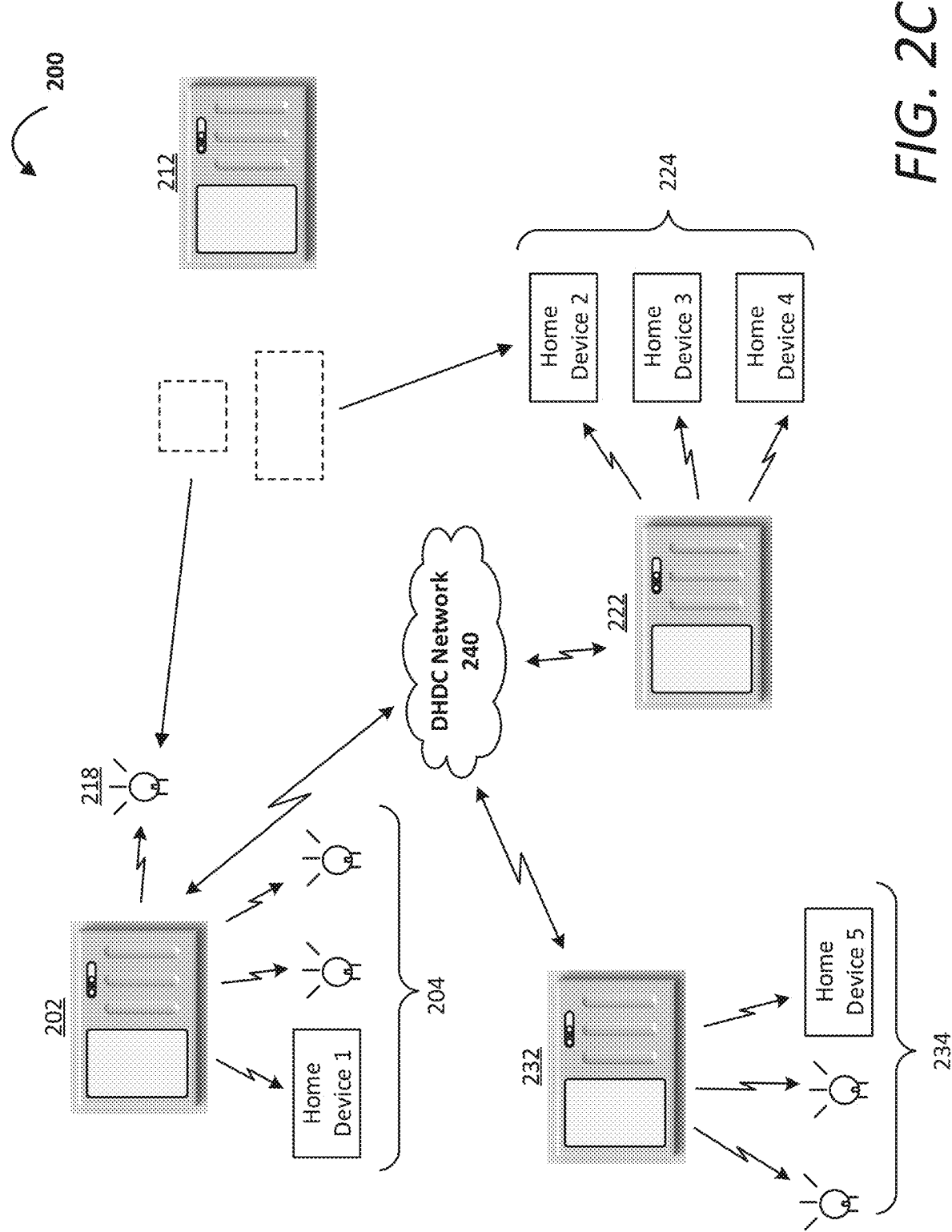

Referring to FIG. 2C, the lease acquisition process for the local network home devices of controller 212 is commenced and promptly resolved by the distributed system 200. For example, the distributed system 200 can collectively determine that home device controller 222 and home device controller 202 are within appropriate proximity to take over the leases, whereas home device controller 232 may be physically too distant to adequately acquire the lease. As an illustrative example, home device 2 may have additional load requirements (e.g., data streaming) that may impact the current load of the remaining home device controllers 202, 222 in the arbitration process. Home device 3 and home device 4 within the local network 224 of home device controller 222 may have minimal load requirements, whereas home device controller 202 may include a load intensive home device 1 within its local network 204 in addition to two light elements.

Thus, the lease acquisition process by the distributed system 200 can result in home device controller 202 acquiring the lease to light element 218, and home device controller 222 acquiring the lease to home device 2. As current leaseholders to light element 218 and home device 2 respectively, home device controller 202 can add light element 218 to its local network of home devices 204 and home device controller 222 can add home device 2 to its local network of home devices 224. In various examples, the respective leaseholder status of home device controller 202 to light element 218 and home device controller 222 to home device 2 may be temporary (e.g., for a fixed amount of time). At expiration of the leaseholder time limit, the lease acquisition arbitration process for light element 218 and home device 2 may be repeated given the current, updated load on the home controller devices 202, 222, 232 in the existing distributed system 200. In variations, the lease acquirer can maintain the lease to the home device until the downed home device controller 212 reactivates or otherwise comes back online. However, it is further contemplated that the home device controllers 202, 212 can maintain the leases to the light element 218 and home device 2 respectively, and/or the distributed system 200 can enter into a new lease arbitration process for any of the home devices shown in FIG. 2C given that home device controller 212 has been reintroduced to the system 200 (e.g., to most optimally spread load in the system 200).

Furthermore, home device controller 202 and 222 can determine the last published states of the light element 218 and home device 2 in order to reestablish or maintain their current states. For example, if light element 218 was on and had a dim value of six (e.g., between one and ten) at the time of the fault condition, when home device controller 202 acquires the lease to light element 218, it can perform a lookup in the message bus or distributed data store to acknowledge and/or republish named values corresponding to the current dim value of light element 218 to the message bus. Thus, while light element 218 and home device 2 are controlled by controller 202 and 222 respectively, the controllers 202, 222 can execute state changes to those devices and can publish the state changes to the message bus accordingly.

Figure 2D:
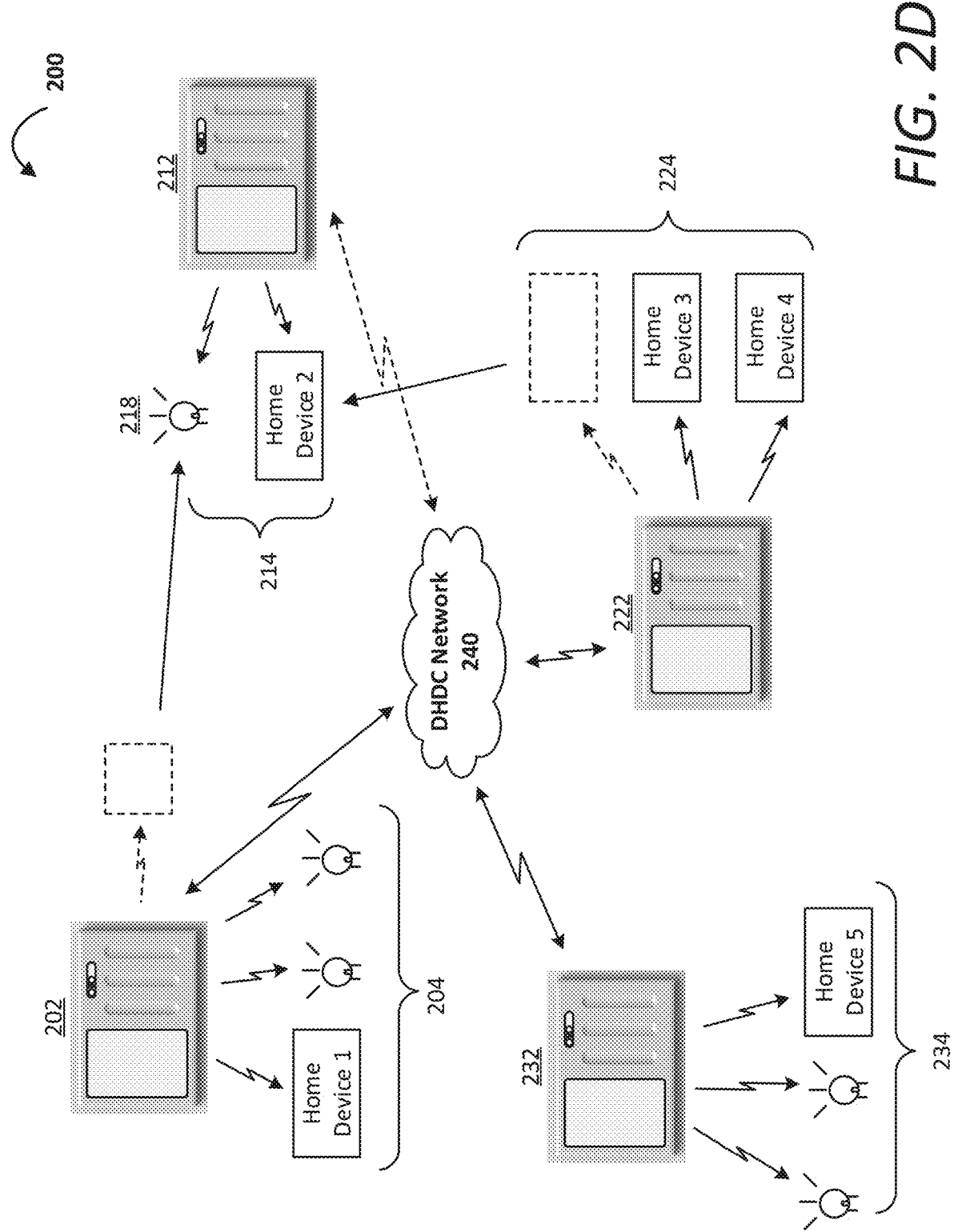

Referring to FIG. 2D, home device controller 212 can be reactivated following resolution of the fault condition. In certain examples, home device controller 212 can have priority to these home devices, and therefore automatically acquire the leases to light element 218 and home device 2 upon coming back online. For example, when the fault condition is resolved, home device controller 212 can reestablish a connection to the DHDC network 240 can publish a resolution message on the message bus, and acquisition request for the leases to light element 218 and home device 3. Upon detecting the acquisition request or resolution message on the message bus, in certain aspects, home device controller 202 and home device controller 222 can relinquish the leases to light element 218 and home device 2 respectively to home device controller 212. In variations, the resolution of the fault condition can cause the system 200 to initiate a lease arbitration process including home device controller 212. In the example shown in FIG. 2D, the lease arbitration process results in home device controller 212 acquiring light element 218 and home device 2. However, the lease arbitration process triggered by home device controller 212 coming back online can result in a reshuffling of the home devices within the local networks 204, 214, 224, 234 of the home device controllers 202, 212,222, 232 (e.g., based on individual fitness levels of each home device controller 204, 214, 224, 234 in acquiring any given home device).

Methodology

Figure 3:
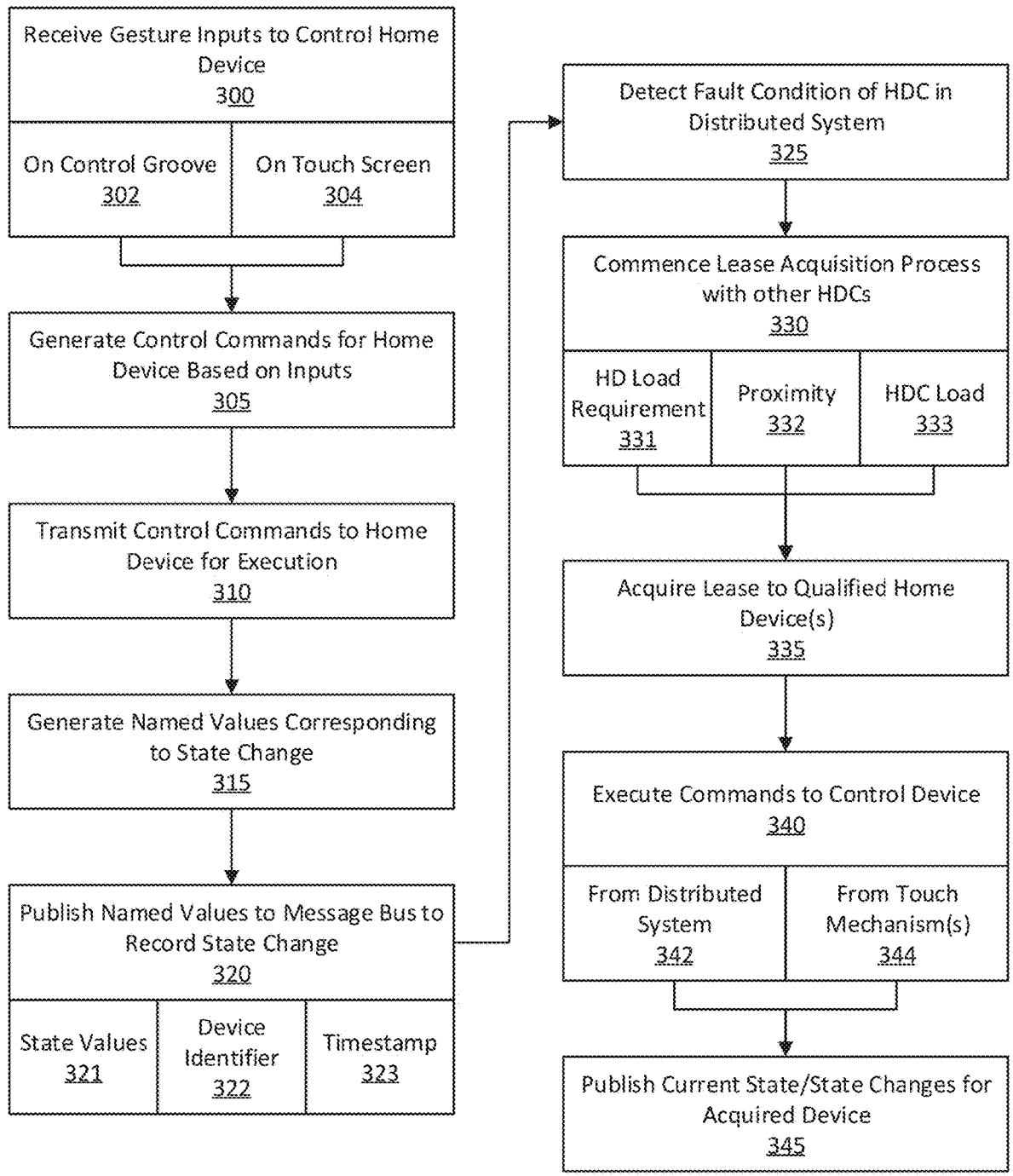
FIGS. 3 and 4 are flow charts describing example methods of acquiring and managing connection leases to home devices in a distributed system of home device controllers, according to various implementations.
Figure 4:
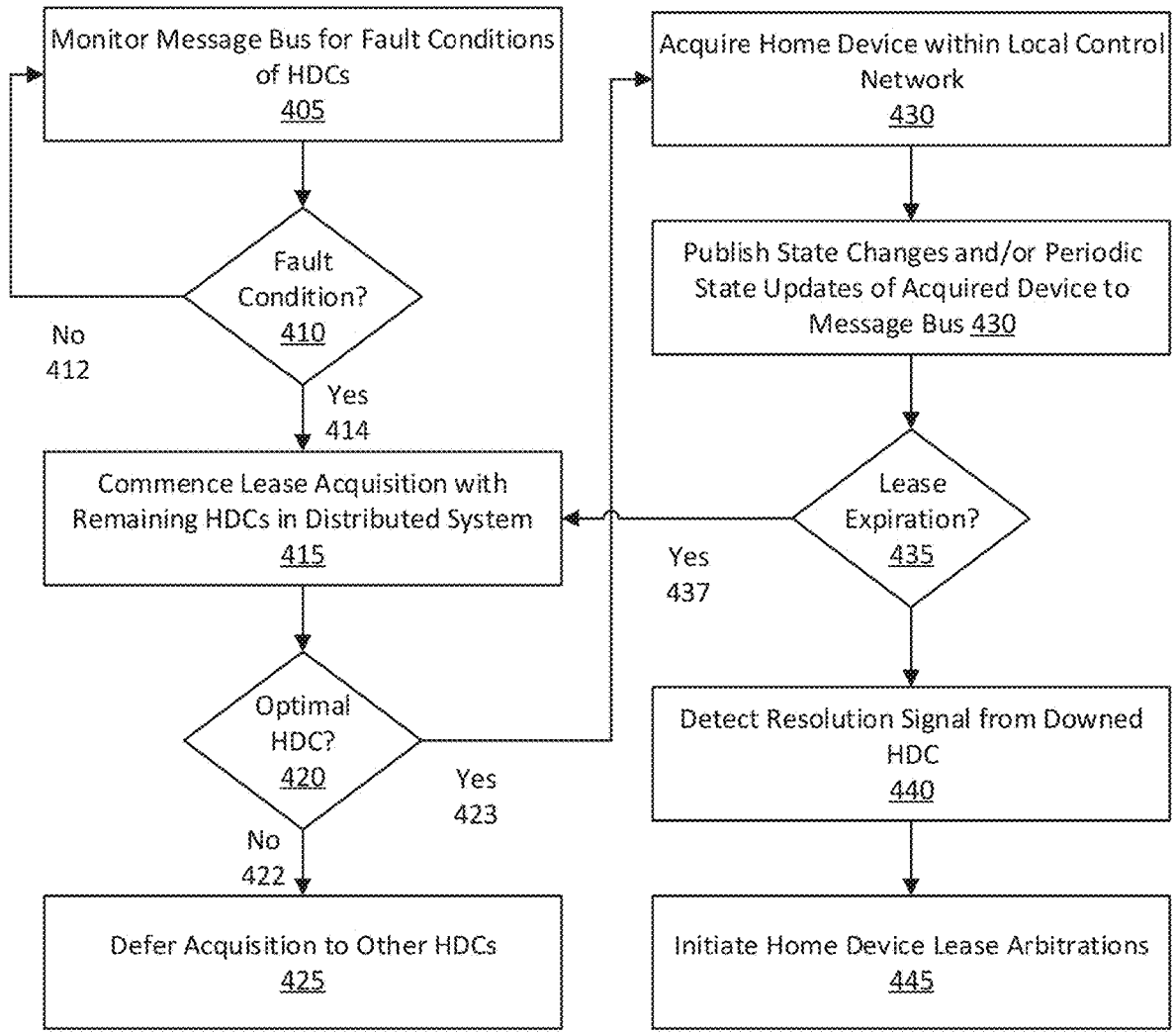

FIGS. 3 and 4 are flow charts describing methods of acquiring and managing connection leases to home devices in a distributed system of home device controllers, according to various implementations. In the below description of FIGS. 3 and 4, reference may be made to reference characters representing like features as shown and described with respect to FIGS. 1A, 1B, and 2A through 2D. Furthermore, the processes described in connection with FIGS. 3 and 4 may be performed by controllers or processing resources of one or more home device controllers 100, 200 as shown and described with respect to FIGS. 1A through 2D.

Referring to FIG. 3, a home device controller 100 in a distributed system of home device controllers 200 can receive gesture inputs to control a particular home device (300). For example, the gesture inputs may be received on a touch control groove (302), or on the touch screen of the home control device 100 (304). Based on the gesture inputs, the home device controller 100 can generate control commands for the home device (305), and transmit the control commands to the home device for execution (310). The home device controller 100 can generate named values corresponding to the state change of the home device (320), and publish the named values to the message bus of the distributed system 200 to record the state change (320). The named values can comprise state values indicating the adjusted parameter levels of the home device (e.g., dim level, temperature setting, fan speed, volume level, etc.) (321). The named values can further comprise a device identifier for the home device being controlled (322). The named values may also include a timestamp indicating the time of the state change on the home device (323).

At any given time, the home device controller 100 can detect a fault condition of a particular home device controller in the distributed system 200 (325). For example, the fault condition can be detected due to a periodic update time expiration lapsing with a state update from the home device controller, or a fault message being published to the message bus from the downed home device controller. Upon detecting the fault condition, the home device controller 100 can commence or initiate a lease acquisition arbitration process with the remaining home device controllers in the distributed system 200 (330). In various examples, the lease arbitration process can comprise determinations regarding the home device load requirements (331), the proximity of the home device controller 100 to the acquirable home devices (332), and the current and/or expected network load(s) on the home device controller 100 (333), all of which can indicate whether the home device controller 100 can comprise a candidate to acquire a lease for a home device of the downed home device controller.

Additional acquisition rules may be considered by the distributed system 200 based on the requirements of the acquirable device and the capabilities of the home device controller 100. In certain examples, leases of each home device of the downed home device controller can be arbitrated upon by the remaining controllers, such that the cumulative effect of the acquisitions result in, collectively, (i) the most capable home device controllers acquiring the home devices, and (ii) an optimal spreading of load amongst the remaining home device controllers. Further, the arbitration process can comprise an objective process such that contention between the home control devices is minimized or eliminated.

According to certain embodiments, the home device controller can acquire a lease to one or more qualified home devices that the home device controller 100 is optimally situated and/or configured to acquire based on the arbitration process (335). In acquiring the lease, the home device controller 100 can establish a local connection with the home device to acquire the home device within the local network of the home device controller 100. Additionally or alternatively, the home device controller can map or remap gesture input interpretations on the touch screen and/or a control groove for the acquire home device such that touch gestures performed on the screen or control groove can control the acquired device.

In various examples, the home device controller 100, as temporary leaseholder, can execute commands to control the acquired home device (340). Such commands can be generated at the touch mechanisms of the home device controller 100 (344), or can originate from any other home device controller in the distributed system 200 and be relayed to the home device controller (342). While the home device controller 100 remains leaseholder, it can publish any state changes and/or periodic state updates corresponding to the acquired home device to the message bus of the distributed system 200 (345).

FIG. 4 is a flow chart describing an example method of resolving a fault conditions within a distributed system of home device controllers, according to various embodiments. In certain examples, a home device controller 100 can subscribe to a home device controller's publications on the message bus of the distributed system 200. As provided herein, a subscription architecture may provide at least one level of redundancy for the recorded states of each home device controller and the home devices within that controller's local network. In certain implementations, each home device controller can have at least one subscriber home device controller to any state updates published to the message bus and distributed data store of the system 200. In variations, the message bus and distributed data store can be monitored by each home device controller in the system 200. In such variations, every home device controller can monitor the message bus for fault conditions occurring on any other home device controller in the system 200.

Referring to FIG. 4, the home device controller 100 can monitor the data store and/or message bus for fault conditions of other home device controllers in the distributed system (405). At any given time, the home device controller 100 can determine whether a fault condition exists with respect to any home device controller (410). If not (412), the home device controller 100 can continue operating nominally and monitor the message bus (405). However, if a fault condition is detected (414), the home device controller 100 can commence or initiate a lease acquisition process with the remaining home device controllers 100 in the distributed system 200 for the acquirable home device of the downed home device controller (415).

In performing the lease acquisition process, for each acquirable home device, the home device controller 100 can objectively determine whether it is an optimal controller as compared to the other remaining home device controllers in the system 200 (420). If not (422), the home device controller 100 can defer acquisition of the home device(s) to the other home device controllers in the system 200 (425). For example, the home device controller 100 and/or the system 200 can compute a wait time for the controller 100 acquiring the lease based on the controller's fitness for controlling the home device, where higher fitness controllers take temporal precedence over lower fitness controllers. However, if the home controller device 100 is an optimal acquirer (e.g., a higher fitness controller) for any given home device of the downed controller (423), then the home device controller 100 can acquire the home device and establish the home device within the local control network of the home device controller 100 (430). In some aspects, the higher fitness home device controller can compute a shorter relative wait time to attempt acquisition as compared to the other lower fitness controllers, which can result in the controller acquiring one or more of the lease(s). In acquiring each lease, the home device controller 100 will add the home device to its local network and publish a lease acquisition message (e.g., as a new named value) to the message bus indicating the lease acquisition. Additionally or alternatively, the home device controller can map or remap gesture input interpretations on the touch screen and/or a control groove for the acquire home device such that touch gestures performed on the screen or control groove can control the acquired device.

Thereafter, the home device controller 100 can publish state changes and/or periodic state updates of the acquired home device to the message bus (430). As described herein, the lease may expire periodically to refresh the acquisition process to ensure that home device controllers with maximal relative "fitness" end up being the lease acquirers, and to ensure that load is spread evenly across the distributed system 200. Thus, the home device controller 100 can determine whether the lease has expired or otherwise detect a lease expiration trigger (435). If the lease has expired (437), then the home device controller 100 can initiate or otherwise share in another round of arbitration with the other device controllers in the system 200 (415) to cause the lease of the home device to be acquired accordingly. Accordingly, the lease holding and acquisition of home devices of a downed home device controller within the distributed system can be dynamic and constantly changing.

At any given time, the home device controller 100 can detect a resolution signal from the downed home device controller indicating that the fault condition has been resolved (440). The resolution signal can comprise a resolution message published to the message bus, or a discovery process between the home device controller 100 and the resolved home device controller. In various examples, the detection of the resolved home device controller can trigger the system 200 enter into additional lease arbitration processes for relevant home devices to optimally spread load throughout the system 200 (445) (e.g., based on fitness metrics corresponding to each home device controller with respect to acquiring leases to home devices).

Hardware Diagram

Figure 5:
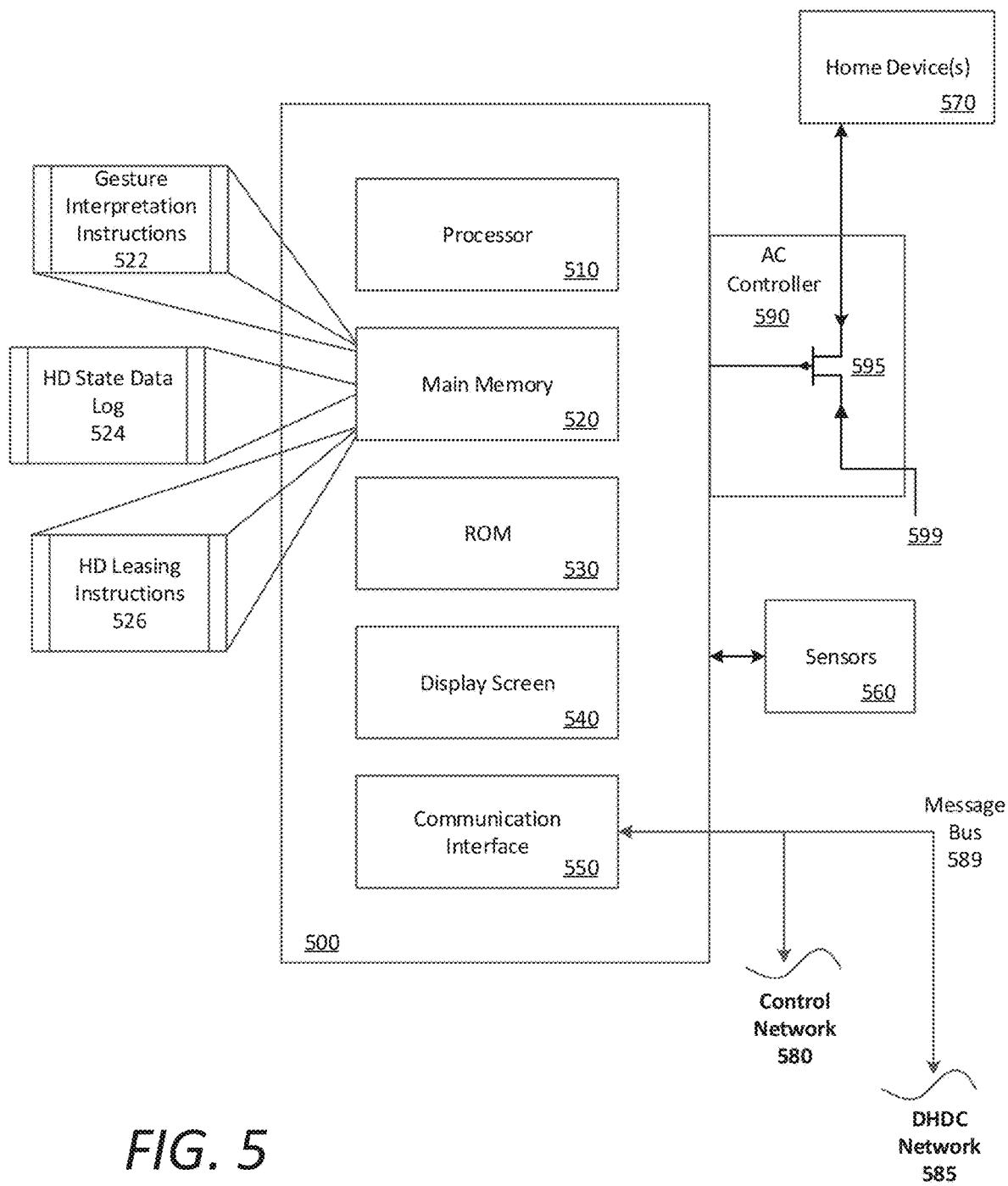
FIG. 5 is a hardware diagram illustrating a computing device upon which example home device controllers described herein may be implemented.

FIG. 5 is a hardware diagram illustrating a computing device upon which example home device controllers described herein may be implemented. For example, the computing device 500 can comprise the logic and processing performed via user interaction with the home device controllers 100, 200 as shown and described with respect to FIGS. 1A through 4. In one implementation, the computing device 500, or home controller 500 (used interchangeably) includes processing resources 510, a main memory 520, a read-only memory (ROM) 530, a display 540, and a communication interface 550. The computing device 500 includes at least one processor 510 for processing information stored in the main memory 520, such as provided by a random-access memory (RAM) or other dynamic storage device, for storing information and instructions which are executable by the processor 510. As provided herein, the "microcontroller" or "microprocessor" described throughout can comprise the processor 510 or combination of the processor 510 and main memory 520 as shown and described with respect to FIG. 5. In various embodiments, the microprocessor may be a general-purpose microprocessor, a microcontroller, a combination of one or more microprocessors and/or microcontrollers acting in concert, and/or a touch sensor specific integrated circuit incorporating, or connected to, one or more of these processing configurations. The main memory 520 also may be used for storing temporary variables or other intermediate information during execution of instructions to be executed by the processor 510. The computing device 500 may also include the ROM 530 or other static storage device for storing static information and instructions for the processor 510.

The communication interface 550 enables the computing device 500 to communicate over one or more control networks 580 (e.g., Bluetooth, Zigbee, Wi-Fi, etc.) through use of one or more wireless network links. Using the network links, the computing device 500 can communicate with one or more home devices, one or more servers or third-party intermediary communication module. The executable instructions in the memory 520 can include gesture interpretation instructions 522, which the computing device 500 can execute to determine gestures performed by users on a particular control groove or on the display screen 540, and generate control commands for the appropriate home device accordingly. For example, the processor 510 can execute the gesture interpretation instructions 522 to receive signals from the sensors 560 coupled to the control groove(s) and/or touch sensors of the display, and generate control commands based on the detected gestures. In certain implementations, the sensors 560 can include one or more audio sensors (e.g., a microphone), a keyboard, and/or a camera.

The executable instructions stored in memory 520 can also include control connectivity instructions 524, which the computing device 500 can execute to selectively connect the communication interface 550 to various home devices to transmit the generated control commands by the processor 510 executing the gesture interpretation instructions 522. As described herein the computing device 500 may be connected via a wired connection to one or more home devices 570 (e.g., light elements), or can implement wireless network protocols to connect with smart home devices via the control network 580 to transmit the control commands and/or the DHDC Network 585 to communicate with other home controller devices and/or publish state updates and changes via a message bus 589.

In some embodiments, the home controller 500 may be coupled to AC controller 590, for example by clips that provide for an electrical connection to be made between spring clips or pogo pins on one side (e.g., the home controller 500 or the AC controller 590) and electrically conductive pads on the corresponding side. AC controller 590 may include connections to wall wiring for line, load, neutral, and/or ground wires, and in some embodiments, may include L1 and L2 outputs for 3-way configurations. In some embodiments, AC controller 590 may include a microcontroller which receives instructions from home controller 500, and which may control field effect transistors, triac(s), and/or other dimming mechanisms, for example as discussed above. In certain examples, the AC controller 590 can include a dimming FET 595 connecting the AC controller 590 to a line wire and load wire of existing wiring (e.g., of a light switch). In the example shown in FIG. 5, the load wire connects the AC controller 590 to the one or more wired home devices 570 (e.g., lights), and the line wire connects the AC controller 590 (a home device controller 500) to a power source 599.

The processor 510 is configured with software and/or other logic to perform one or more processes, steps and other functions described with implementations, such as described with respect to FIGS. 1A through 4 elsewhere in the present application. Examples described herein are related to the use of the computing device 500 for implementing the techniques described herein. According to one example, those techniques are performed by the computing device 500 in response to the processor 510 executing one or more sequences of one or more instructions contained in the main memory 520. Such instructions may be read into the main memory 520 from another machine-readable medium. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A first home device controller comprising:
one or more processors;
a memory to store instructions;
wherein the one or more processors execute instructions stored in the memory to cause the first home device controller to:
operate as part of a distributed system that includes a plurality of home device controllers, each home device controller of the distributed system being connected to (i) a remaining set of home device controllers in the distributed system, and (ii) one or more home devices;
monitor published state data on a message bus of the distributed system, the published state data indicating current states of the one or more home devices connected to each home device controller of the distributed system;
maintain a data store that identifies the current state of each home device and home device controller of the distributed system, the current state for at least a first home device of the one or more home devices indicating an adjustable parameter for operating the first home device;
detect, from the message bus, a fault condition corresponding to a specified home device controller in the remaining set of home device controllers, the specified home device controller being connected to the first home device;
make a determination as to an ability of the first home device controller to acquire the first home device, as compared to each of the home device controllers of the remaining set, wherein making the determination includes determining at least a relative wait time in acquiring the first home device by the first home device controller as compared to one or more of the home device controllers of the remaining set; and
based on the determination, acquire and operate the first home device in its current state, so that the adjustable parameter for operating the first home device is not changed after the first home device controller acquires the first home device.

2. The first home device controller of claim 1, wherein acquiring the first home device includes establishing a network connection with the first home device, performing a lookup on the message bus to determine the current state of the first home device, and transmitting a command to the first home device to maintain the current state of the first home device.

3. The first home device controller of claim 1, wherein the executed instruction set further causes the first home device controller to:

detect, via the message bus, that the specified home device controller is back online; and in response to detecting that the specified home device controller is back online, initiate an arbitration process to determine whether to transfer the first home device from the first home device controller to the specified home device controller.

4. The first home device controller of claim 1, wherein the first home device includes at least one of a light element, an electrical outlet, a door lock, a garage door, a doorbell, a video camera, a cooking appliance, an audio system, a temperature control system, a window shade actuation system, a fan controller, a television, a sprinkler system, or a security system.

5. The first home device controller of claim 1, wherein making the determination includes determining a wireless transmission latency for the first home device controller to communicate with the first home device connected.

6. The first home device controller of claim 1, wherein the specified home device controller comprises a touch surface, and wherein the first home device controller remaps at least one gesture input that was previously performed on the touch surface of the specified home device controller.

7. A method performed by one or more processors of a first home device controller of a distributed system, the method comprising:

monitoring published state data on a message bus of the distributed system of home device controllers, the first home device controller operating as part of the distributed system of home controllers, the published state data indicating current states of home devices connected to each home device controller of the distributed system;

maintaining a data store that identifies the current state of each home device and home device controller of the distributed system, the current state for at least a first home device of the one or more home devices indicating an adjustable parameter for operating the first home device;

detecting, from the message bus, a fault condition corresponding to a specified home device controller in the distributed system of home device controllers, the specified home device controller being connected to the first home device;

making a determination as to an ability of the first home device controller to acquire the first home device, as compared to each of the other home device controllers of the distributed system, wherein making the determination includes determining at least a relative wait time in acquiring the first home device by the first home device controller as compared to one or more other home device controllers of the distributed system; and based on the determination, acquiring and operating the first home device in its current state, so that the adjustable parameter for operating the first home device is not changed after the first home device controller acquires the first home device.

8. The method claim 7, wherein acquiring and operating the first home device of the specified home device controller includes establishing a network connection with the first home device, performing a lookup on the message bus to determine the current state of the first home device, and transmitting a command to the first home device to maintain the current state of the first home device.

9. The method of claim 7, further comprising:

detecting, via the message bus, that the specified home device controller is back online; and in response to detecting that the specified home device controller is back online, initiating an arbitration process to determine whether to transfer the first home device from the first home device controller to the specified home device controller.

10. The method of claim 7, wherein the first home device includes at least one of a light element, an electrical outlet, a door lock, a garage door, a doorbell, a video camera, a cooking appliance, an audio system, a temperature control system, a window shade actuation system, a fan controller, a television, a sprinkler system, or a security system.

11. The method of claim 7, wherein making the determination includes determining a wireless transmission latency for the first home device controller to communicate with the first home device.

12. The method of claim 7, wherein the specified home device controller comprises a touch surface, and wherein the first home device controller remaps at least one gesture input that was previously performed on the touch-surface of the specified home device controller.

13. A non-transitory computer readable medium storing an instruction set that, when executed by one or more processors of a first home device controller in a distributed system of home device controllers, cause the first home device controller to:

communicate, via a wireless communication interface, with a local group of home devices;

monitor published state data on a message bus of the distributed system, the published state data indicating current states of home devices connected to each home device controller of the distributed system;

maintain a data store that identifies the current state of each home device and home device controller of the distributed system, the current state for at least a first home device of the one or more home devices indicating an adjustable parameter for operating the first home device;

detect, from the message bus, a fault condition corresponding to a specified home device controller in the distributed system of home device controllers, the specified home device controller being connected to the first home device;

make a determination as to an ability of the first home device controller to acquire the first home device, as compared to each of the other home device controllers of the distributed system, wherein making the determination includes determining at least a relative wait time in acquiring the first home device by the first home device controller as compared to one or more other home device controllers of the distributed system; and based on the determination, acquire and operate the first home device in its current state, so that the adjustable parameter for operating the first home device is not changed after the first home device controller acquires the first home device.

14. The non-transitory computer readable medium of claim 13, wherein the instruction set, when executed, causes the first home device controller to acquire the first home device by establishing a network connection with the first home device, performing a lookup on the message bus to determine the current state of the first home device, and transmitting a command to the first home device to maintain the current state of the first home device.

15. The non-transitory computer readable medium of claim 13, wherein the instruction set, when executed, causes the first home device controller to:

detect, via the message bus, that the specified home device controller is back online; and in response to detecting that the specified home device controller is back online, initiate an arbitration process to determine whether to transfer the first home device from the first home device controller to the specified home device controller.

16. The non-transitory computer readable medium of claim 13, wherein the first home device includes at least one of a light element, an electrical outlet, a door lock, a garage door, a doorbell, a video camera, a cooking appliance, an audio system, a temperature control system, a window shade actuation system, a fan controller, a television, a sprinkler system, or a security system.

17. The non-transitory computer readable medium of claim 13, wherein making the determination includes determining a wireless transmission latency for the first home device controller to communicate with the first home device.

* * * * *